United States Patent [19]
Hagemann

[11] 3,905,008
[45] Sept. 9, 1975

[54] SEQUENTIAL SAMPLING TELEMETRIC APPARATUS

[75] Inventor: Julius Hagemann, Panama City, Fla.

[73] Assignee: The United States of America as represented by the Secretary of the Navy, Washington, D.C.

[22] Filed: Mar. 23, 1960

[21] Appl. No.: 17,229

[52] U.S. Cl. .............. 340/4 R; 340/3 T; 340/150; 340/183
[51] Int. Cl.² ........................................... G08C 15/08
[58] Field of Search ......... 340/4, 29, 150, 183, 203, 340/155, 206, 18, 3 T

[56] References Cited
UNITED STATES PATENTS

| | | | |
|---|---|---|---|
| 2,471,138 | 5/1949 | Bartelink | 325/39 |
| 2,719,285 | 9/1955 | Greenfield | 340/183 |
| 2,863,139 | 12/1958 | Michelson | 340/183 |

Primary Examiner—Richard A. Farley
Attorney, Agent, or Firm—Louis A. Miller; Rolla N. Carter

EXEMPLARY CLAIM

1. In telemetric apparatus for sampling in rapid succession signal voltages of a given polarity on a plurality of information inputs, a signal voltage sampling network individual to each of said inputs and having first and second terminals, a semiconductor diode having its poles sharing said first and second terminals and arranged to conduct when a voltage of said given polarity is impressed on said second terminal, a single conductor serially connecting unlike poles of neighboring diodes for providing unidirectional conduction for said signal voltages, gate means individual to each information input for applying the signal voltages thereon to said first terminal of its associated sampling network, means for applying a trigger signal input of said given polarity to said first terminal, and means in said network having at least one condition in which it is sensitive to said trigger signal input for opening said gate means for a time interval and thereafter applying to its second terminal a voltage pulse of said given polarity whereby said voltage pulse appears on the first terminal of the neighboring sampling network as a trigger signal input.

5 Claims, 3 Drawing Figures

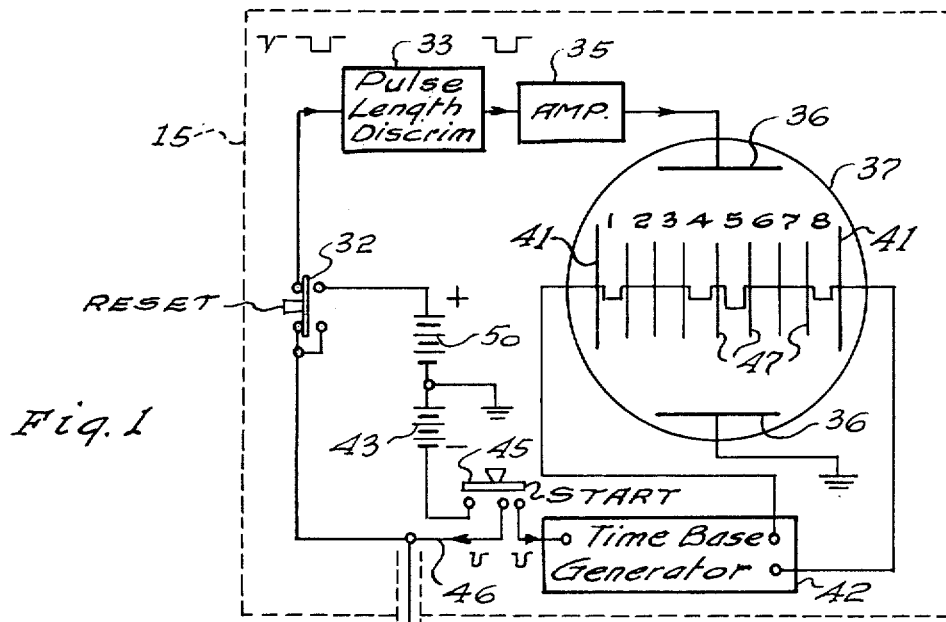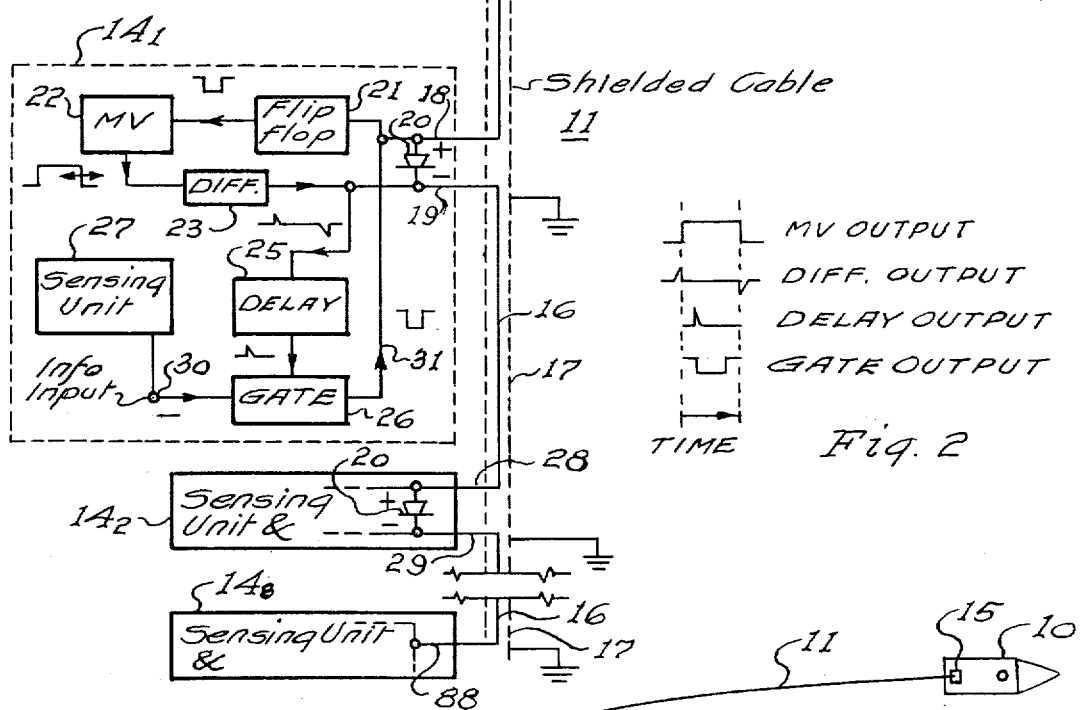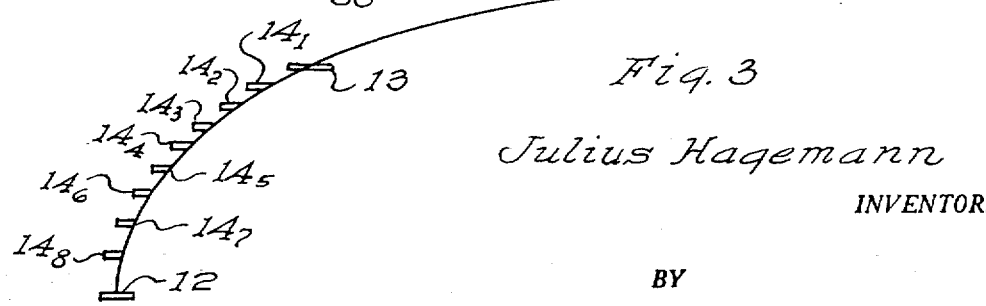

SEQUENTIAL SAMPLING TELEMETRIC APPARATUS

The invention described herein may be manufactured and used by or for the Government of the United States of America for governmental purposes without the payment of any royalties thereon or therefor.

The present invention relates to electric signaling systems and more particularly to telemetric apparatus for surveying in rapid succession signal voltages posted on a plurality of terminals spaced along a single conductor. The specific embodiment to be described was designed for collecting and presenting on shipboard the intelligence acquired by a plurality of sensing units mounted in spaced relation along the distal portion of a sweep cable towed by the ship.

The art of mine hunting includes the technique of towing at a substantially constant height above the ocean floor mine sensing devices designed to develop and transmit to the towing vessel a signal indicative of the presence of a mine-like object. Inasmuch as presently known sensing devices are limited in the distance at which they can detect a mine, it is necessary to employ a number of sensing units to search a path of practical width. The detection range varies with the detection scheme employed from about 12 feet to several times this range. Among the detection principles available are those involving the earth's magnetic field, short range acoustic depth sounding, underwater electro potentials (UEP), etc. The system of the present invention is functionally indifferent to the detection devices employed and the manner in which they are towed at the desired short distance above the ocean floor.

As above indicated multiple detector systems employ rather intricate individual detectors which heretofore required individual conductors extending to the towing vessel and in trying to optimize this system with respect to the expenditures involved and such parameters as path width and definition, increasing difficulties in collecting and presenting the response signals are encountered. When it is remembered that cable lengths of the order of 500 feet are involved, it will be appreciated that a single conductor cable provides considerable advantages in reducing cost and size over that of multi-conductor cables.

An object of the present invention is to provide a telemetric system which utilizes a single conductor cable for sampling in rapid sequence signals provided by a plurality of detectors or sensing units.

Other objects and attendant advantages of the invention as well as the invention itself will be understood from the following description when read in connection with the accompanying drawing in which:

FIG. 1 is a conventionalized showing of an apparatus incorporating the invention;

FIG. 2 is a timing diagram illustrating the operation of a sampling unit utilized in the apparatus of FIG. 1; and FIG. 3 illustrates a minehunting spread in which the invention may be incorporated.

As shown in FIG. 3, a vessel 10 has under tow a minehunting spread including an insulated single conductor cable 11, preferably shielded, which may comprise the tow cable or may be married to a strain taking tow cable as is well known. Also as is known, the tail portion of the cable 11 is diverted to one side by a suitable device 12 secured to the end of the cable 11, the device 12 also including means for supporting itself and therefore the cable end at a substantially fixed distance above the bottom, say 5 to 8 feet. At that section in the cable 11 where its curvature due to the diverting action of the device 12 becomes marked, an above the bottom riding vehicle 13 is provided to cause the cable 11 to ride at the same distance, i.e., 5 to 8 feet above the bottom. Spaced along the length of the cable between the devices 12 and 13 are a plurality of sensing and sampling units 14 (here shown as eight) for providing to a console 15 aboard the towing vessel 10 signals representative of the presence or absence of mine-like objects on the bottom over which they pass.

The details of a system as above described are shown schematically in FIG. 1 wherein the shielded cable 11 is indicated as having a single conductor 16 surrounded by a shield 17 and electrically isolated by insulation not shown. At appropriate points along the cable 11, the units $14_1$ to $14_n$ are connected in series with the conductor 16 such as by opening the conductor 16 and bringing out two leads which are spliced to leads 18 and 19, 28 and 29, etc., respectively, in the sensing devices 14. In practice, these connections between the units 14 and the conductor 16 will preferably be of the plug-in type of strain-proof connectors for easy attachment and detachment. The leads 18 and 19 are bridged by a diode 20 with its positive terminal upstream, i.e., toward the ship 10, whereby the conductor 16 is effectively continuous for the passage of positive pulses downstream and of negative pulses upstream but not vice versa. The lead 18 is connected to a flip-flop circuit 21 having two stable positions which, when in position to be triggered by a negative pulse arriving over lead 18, emits a negative pulse to trigger a monostable multivibrator 22 to produce a positive pulse of an adjusted length. This positive pulse is differentiated by a differentiator 23, the leading positive spike of which preferably after a short delay in a delay circuit 25 opens a gate 26 for a time interval less than the pulse length output of the multivibrator 22, and the trailing negative spike is applied to the next sensing unit $14_2$. A sensing unit 27, which for example may include a magnetic field gradiometer, is constructed to provide on an information input terminal 30 a negative voltage representing the intelligence acquired by the sensing unit 27. This voltage provided by the sensing unit 27 on the input terminal 30 passes through the gate 26 whenever the gate is open and on a lead 31 to the lead 18 connected to the cable conductor 16, but being negative it will not cross over to the lead 19. This information signal passes upstream along the cable conductor 16 to the console 15 and through a normally closed reset switch 32, a pulse length discriminator 33 and an amplifier 35 to be applied to the vertical plates 36 of a cathode ray tube 37, the horizontal plates 41 of which are connected to be energized by an increasing voltage from a time base generator 42 connected to be triggered by a negative voltage from a suitable source 43 when a normally open start switch 45 is momentarily closed. The closing of the switch 45 also connects the source of negative voltage 43 through a lead 46, the conductor 16 and the lead 18 to the flip-flop circuit 21 to initiate the cycle of operation of the unit $14_1$ above described.

The negative spike of the differentiated output of the differentiator 23 is applied through lead 19 and the cable conductor 16 to the lead 28 for the next sensing and sampling unit $14_2$ to cause it to complete an operating cycle, the same as just described in connection with the unit $14_1$. It is to be noted that this negative spike also travels upstream through the diode 20 but is eliminated by the pulse length discriminator 33 and does not affect vertical deflection in the cathode ray tube 37. However, it can be pointed out that very little harm is done by permitting these spikes to appear on the cathode ray tube 37 since they do not coincide with the deflections representing information and would in fact offer an advantage if the face of the cathode ray tube 37 is not provided with the graduation marks 47 as illustrated. All of the sensing and sampling units $14_1$ through $14_N$ are identical except that the most distant unit $14_N$ need be provided with only an upstream lead 88. After the unit $14_N$ has been sampled the system becomes quiescent with the flip-flop units 21 reversed from their original condition. These units 21 are again rendered sensitive to negative pulses by introducing a positive pulse to the conductor 16 as by depressing the reset switch 32 to connect a source of positive potential 50 to the conductor 16.

The operation of the system of FIG. 1 through one complete cycle will now be described. After the reset switch 32 has been depressed to render all of the flip-flop units 21 in the stable condition where they are sensitive to be triggered by a negative pulse, the start switch 45 is depressed to trigger the time base generator 42 to initiate the horizontal sweep across the cathode ray tube 37 and simultaneously transmit a negative pulse to trigger the flip-flop 21 in the first sensing and sampling unit $14_1$, which triggering pulse goes no farther by reason of the blocking action of the diode 20. The transfer of conduction from one side to the other of the flip-flop unit 21 transmits a negative pulse to the monostable multivibrator 22 whose output is a positive pulse of a selected length which is differentiated by the circuit 23 to provide a leading positive spike which after a short delay introduced by the circuit 25 opens the gate 26 for an interval less than the length in time of the pulse output from the multivibrator 22 minus the delay time of the circuit 25. The opening of the gate 26 transmits any negative signal posted on the information input terminal 30 by the sensing unit 27 to the vertical deflection plates 36 of the cathode ray tube 37 via leads 31 and 18, the conductor 16, the pulse length discriminator 33 and the amplifier 35. The output of the amplifier 35 may of course be applied to the intensity grid of the tube 37 to provide an intensity modulation display. The time base generator 42 having been properly adjusted, the deflection of the cathode ray caused by the signal from the unit $14_1$ will appear in the graduated space 1 on the face of the tube 37. After the gate 26 closes, the trailing negative spike from the differentiator 23 is fed over the lead 19, the conductor 16 and the lead 28 to the flip-flop unit 21 in the sensing and sampling unit $14_2$ which thereupon repeats the action of the unit $14_1$ to supply to the vertical deflecting plates 36 a voltage representative of the intelligence sensed by the unit 27, this information appearing in the graduated space 2 on the face of the cathode ray tube 37 and here shown as being no signal. In a similar fashion, all of the other sensing and sampling units will be sequentially triggered in rapid succession with their sensed information appearing in corresponding graduated spaces on the face of the cathode ray tube 37 and after the last unit $14_N$ has so delivered its information the cycle is complete and can be immediately repeated by again depressing the reset switch 32 and the start switch 45 in succession. Under circumstances such as prevail in fixed installations where a sampling cycle is desired only at widely spaced intervals, the switches 32 and 45 may be manually actuated as indicated. However, under other circumstances, such as in a mine-hunting operation as illustrated in FIG. 3 where the towing vessel 10 may proceed at 6 knots, it is desirable that the sampling be substantially continuous, i.e., 10 or more cycles per second; the function of the reset switch 32 and the start switch 45 will be accomplished electronically or by a suitable timer-contactor device.

Although with ideal equipment, it might be possible to detect the location of a mine-like object by sampling the sensing units once during each interval of time equal to the interval required for the sensing unit to travel somewhat less than twice its detection range; in practice, spurious or ghost signals are always prevalent and it is desirable to take many "looks" at the response to each true target. By way of example, if it is assumed that the sensing units have aa combined fore and aft detection range of 16 feet and the tow speed is 8 feet per second, then a mine-like object (ignoring its dimensions) will be detected for a 2 second interval. Now, if during this 2 second interval 20 sampling cycles are completed, the successive displays on the cathode ray tube 37 will in effect be integrated so that the presence of a mine-like object can be readily recognized by a skilled observer. A chemical or other recorder, such as a helical recorder, operated in time relation with the time base generator 42 will similarly "integrate" a series of consecutive signals to appear as a well recognizable area on the resulting record. With knowledge of the position of the towing vessel 10 at the instant a mine-like object is indicated by the system of the invention, the position of the mine on the bottom can be determined by known methods which need not be here considered or explored.

From the foregoing description it will be apparent to those skilled in the art that a very useful feature of the invention is the provision of what in effect are relay stations located adjacent the signal information to be sampled thereby making the apparatus of the invention readily adaptable to telemetering by means of a single conductor, signal information derived at many points widely separated in space, which capability is absent in known commutating systems. The console 15 may be replaced by any other suitable utilization device having the capability of translating the received signal information to a form meaningful to the operator or to associated equipment. While for the purpose of disclosing the invention a preferred embodiment thereof has been described in language more or less specific to such embodiment, it is to be understood that the invention is not limited to the specific features shown but includes those many modifications which will readily suggest themselves to those skilled in the art without departing from the scope of the appended claims.

While in the embodiment disclosed, only eight sampling units have been shown as being surveyed in succession, it will be appreciated that there is substantially no limitation on the number of information sources which may be sampled inasmuch as each sampling unit is selfsufficient, it being only required that it be connected to its immediate neighbors by a single conductor.

What is claimed is:

1. An apparatus comprising a cable having a conductive sheath and at least one conductor surrounded by and insulated from said sheath, a display system connected to and defining the upstream end of said conductor, a plurality of similarly oriented diodes connected in series with and spaced along the length of said conductor so that voltage pulses of opposite polarity are transmitted only in opposite directions, circuit networks individual to and having upstream and downstream terminals connected in shunt with said diodes, each of said networks including an information input adapted to receive an information voltage of the polarity which is transmitted upstream, a normally closed gate connected between said information input and the upstream network terminal and adapted to be opened by a pulse of the polarity which is transmitted downstream, a flip-flop circuit having an input terminal and an output terminal and arranged to be triggered from a selected condition of rest to the alternate condition in response to a pulse on its input terminal of the polarity which is transmitted upstream and to be returned to the selected condition of rest in response to a pulse on its input terminal of the polarity which is transmitted downstream, a multivibrator for producing a relatively long pulse in response to said flip-flop circuit being moved to said alternate condition, means for differentiating said long pulse to produce leading and trailing spikes of the polarities which are transmitted downstream and upstream, respectively, means for applying said leading and trailing spikes to said gate and to the downstream network terminal whereby said gate is opened by the leading spike and the trailing spike passes downstream to trigger the flip-flop circuit in the neighboring circuit network, said gate being arranged to have an open time somewhat less than the time interval between said leading and trailing spikes so that the information voltage on said information input is transmitted to the display system prior to the triggering of said neighboring circuit network, and means for applying a triggering pulse to the upstream end of said conductor.

2. Apparatus in accordance with claim 1 wherein the display system includes a cathode ray oscilloscope, a time base generator having its output connected to a pair of deflecting elements of the oscilloscope, and said means for applying a triggering pulse to said conductor simultaneously applies a triggering pulse to the time base generator.

3. In telemetric apparatus for sampling in rapid succession signal voltages of a given polarity on a plurality of information inputs, a signal voltage sampling network individual to each of said inputs and having first and second terminals, a semiconductor diode having its poles sharing said first and second terminals and arranged to conduct when a voltage of said given polarity is impressed on said second terminal, a single conductor serially connecting unlike poles of neighboring diodes for providing unidirectional conduction for said signal voltages, gate means individual to each information input for applying the signal voltages thereon to said first terminal of its associated sampling network, means for applying a trigger signal input of said given polarity to said first terminal, and means in said network having at least one condition in which it is sensitive to said trigger signal input for opening said gate means for a time interval and thereafter applying to its second terminal a voltage pulse of said given polarity whereby said voltage pulse appears on the first terminal of the neighboring sampling network as a trigger signal input.

4. Telemetric apparatus of the type described in claim 3 including a utilization device connected by a single lead to the first terminal of the proximal sampling network, and means for applying to said single lead a voltage pulse of said given polarity for initiating a sampling cycle.

5. Telemetric apparatus in accordance with claim 4 wherein said network means after being triggered are restored to said sensitive condition by a voltage pulse of a polarity opposite said given polarity, and means for applying to said single lead a voltage pulse of said opposite polarity for restoring all of said network means to said sensitive condition.

* * * * *